No. 643,720. Patented Feb. 20, 1900.
H. W. LOCKE.
SWING BACK FOR PHOTOGRAPHIC CAMERAS.
(Application filed Aug. 22, 1899.)

(No Model.) 2 Sheets—Sheet 1.

Witnesses
Jos. S. Latimer
Theo. F. Snell

Inventor
Harvey W. Locke
by Arthur Browne
his Attorney

THE NORRIS PETERS CO., PHOTO-LITHO., WASHINGTON, D. C.

No. 643,720. Patented Feb. 20, 1900.
H. W. LOCKE.
SWING BACK FOR PHOTOGRAPHIC CAMERAS.
(Application filed Aug. 22, 1899.)
(No Model.) 2 Sheets—Sheet 2.
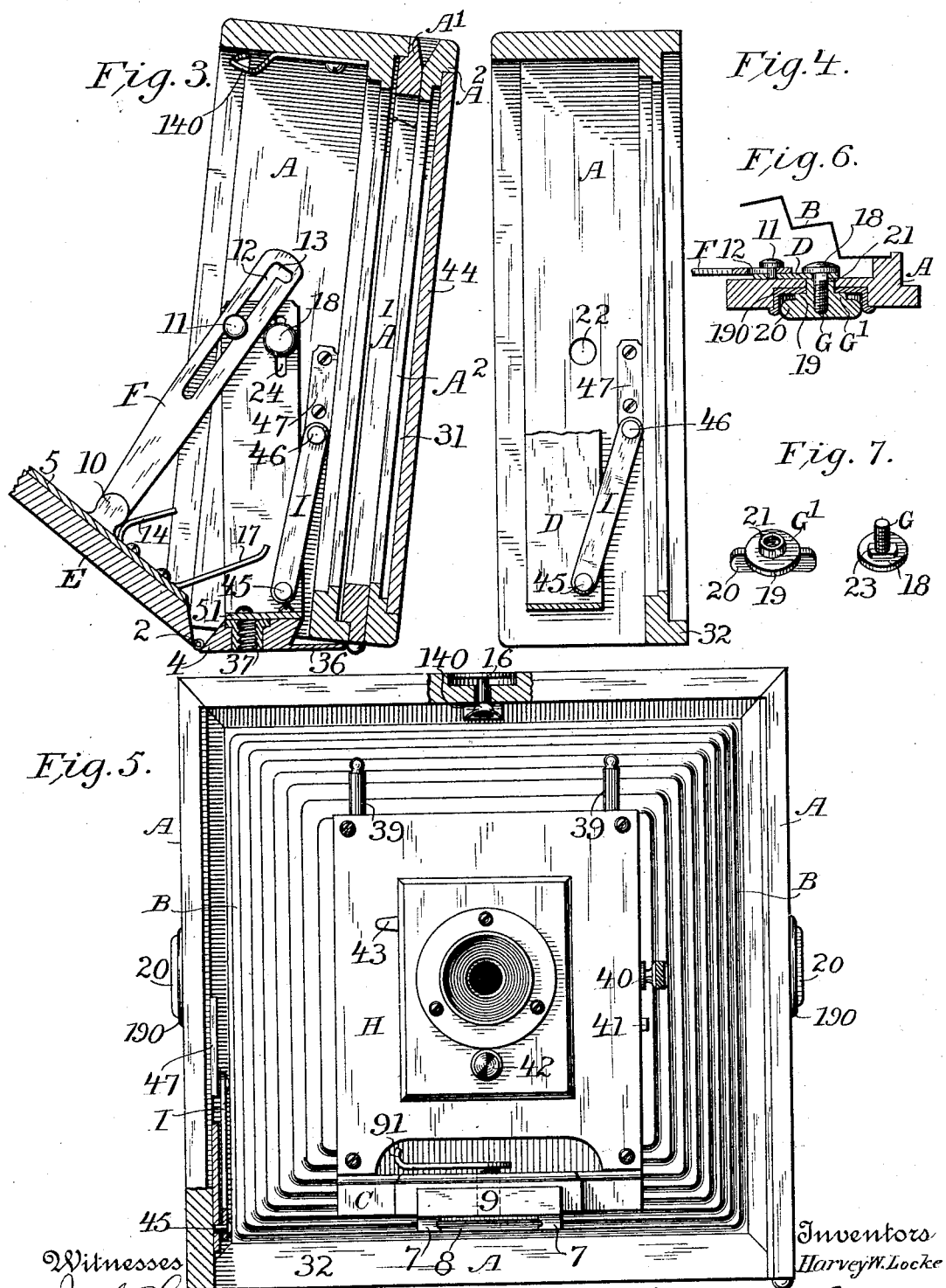

UNITED STATES PATENT OFFICE.

HARVEY W. LOCKE, OF ROCHESTER, NEW YORK, ASSIGNOR TO WILLIAM F. CARLTON, OF SAME PLACE.

SWING-BACK FOR PHOTOGRAPHIC CAMERAS.

SPECIFICATION forming part of Letters Patent No. 643,720, dated February 20, 1900.

Application filed August 22, 1899. Serial No. 728,116. (No model.)

*To all whom it may concern:*

Be it known that I, HARVEY W. LOCKE, of Rochester, in the county of Monroe and State of New York, have invented a new and useful Improvement in Swing-Backs for Photographic Cameras, of which the following is a specification.

The present invention is an improvement upon the swing-back mechanism set forth in an application for United States Letters Patent filed jointly by myself and William F. Carlton February 11, 1899, Serial No. 705,287. In said application is described a camera having a swing-back which is pivotally connected to the camera-frame in such manner that the back not only swings so as to vary the inclination of the sensitive surface, the axis of swing being substantially at the middle of the back, but also has a movement of translation or an up-and-down movement, so that the swing of the back does not interfere with the proper incasing of the camera when not in use. The present invention consists in the improved means employed for securing the swing-back to the camera-frame so as to swing properly and so as to move up and down.

For the purpose of setting forth the improvement it will be described as applied to a camera having an adjustable lens-holder connected with the swing-back by a bellows.

The improvement is illustrated in the accompanying drawings, wherein—

Figure 1:
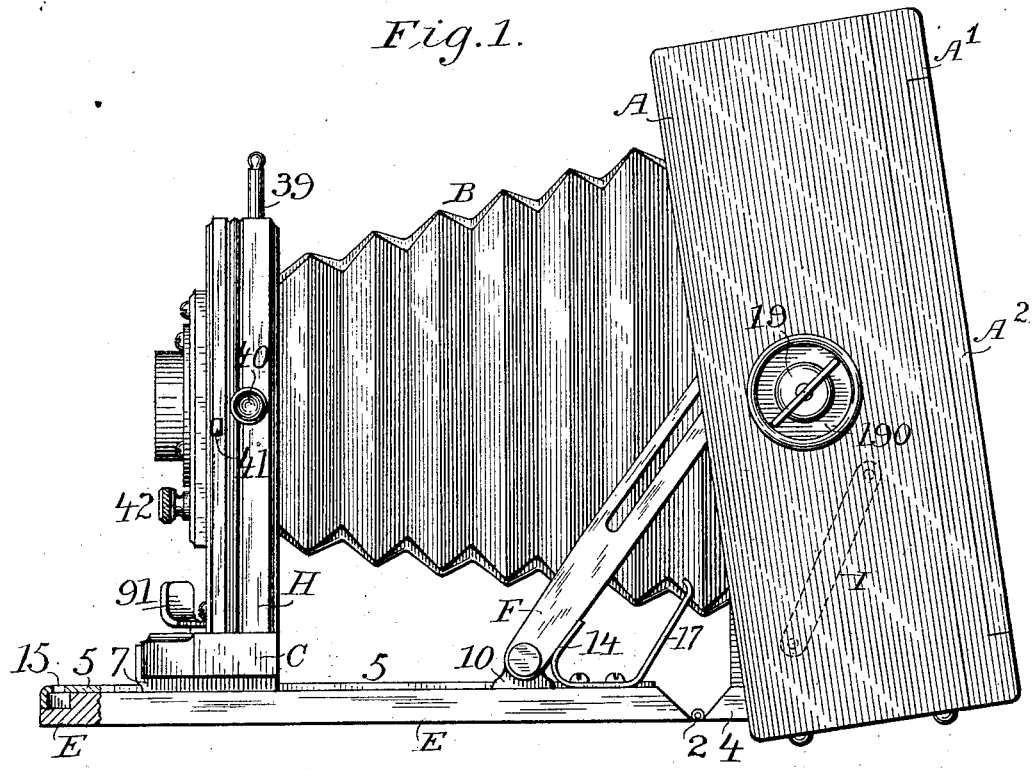
Figure 2:
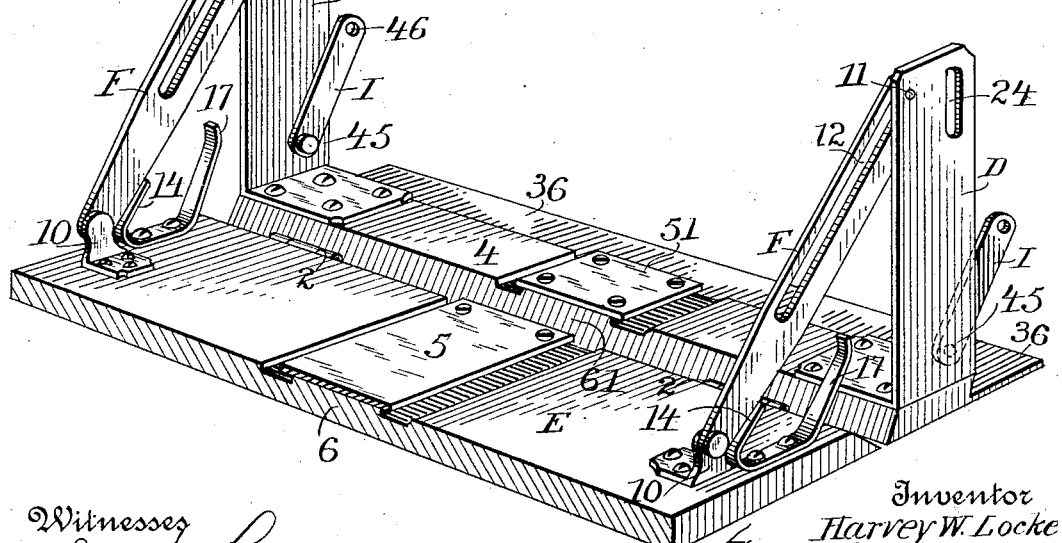

Figure 1 is a side view, partly in section, of a camera open or extended for use. Fig. 2 is a perspective view, partly in section, of the camera-bed, the supports for the camera-box, and the cross-piece, through the intermediary of which the said bed and supports are connected. Fig. 3 is a vertical section taken longitudinally of the bed and showing the camera-box, the camera-box supports, with their cross-piece, and a portion of the camera-bed. Fig. 4 is a vertical section of the camera-box. Fig. 5 is a face view of the camera-box with the camera-front and bellows incased therein, the camera-bed and its supports, with their cross-piece, being removed. Figs. 6 and 7 are detail views.

The illustrated camera comprises as its main structural features the swing-back A, the camera-bed E, the camera-front C, which carries the lens, and the bellows B, connecting the camera-front to the swing-back.

The camera-bed E is preferably hinged by hinges 2 to a cross-bar 4, so that the bed may be swung upwardly to constitute a cover for the camera when not in use. When the camera is in use and the bed E is swung down, the cross-bar 4 constitutes, essentially, a portion of the camera-bed. Rising from the cross-bar 4 are vertically-extending supports D D at opposite ends and rigidly secured thereto, to which the swing-back is hinged. The portion E of the camera-bed, which constitutes the cover of the camera when closed, is locked in its open position, so that the cross-bar constitutes a rigid prolongation thereof, by means of links F F, which are pivoted at their lower ends to ears 10 10, carried by the bed E, and which are respectively provided with longitudinal slots 12 12, having locking-notches 13 (see Fig. 3) at their upper ends, said slots and notches engaging headed pins 11, carried by the supports D D, respectively. The longitudinal slots 12 enable the cover E to be swung up and down, and when the cover is in its open position the locking-notches 13 catch upon the pins 11, and thereby lock the cover in its open position. Springs 14, carried by the cover E and engaging the links F F, cause the automatic locking engagement of the locking-notches 13 and the pins 11 when the cover is swung fully open.

The swing-back A, which carries the sensitive photographic surface and which is pivotally connected with the supports D D of the camera-bed, is formed as a rectangular box open at front, back, and bottom and which constitutes a casing for the bellows and camera-front when the camera is not in use. The swing-back, which is thus also the camera box or casing, may be constructed so as to carry any kind of sensitive photographic surface. It is shown as open in the back and adapted to receive a reversible back-frame A' for retaining photographic-plate holders, said reversible back-frame being shown as provided with a spring-actuated receding and plate-holding device $A^3$, having a groove 31 to receive a ground-glass plate (not shown)

and a lid or panel 44, which permits the exposure of the ground-glass plate when focusing the camera. This construction and arrangement of reversible back-frame is well known in the art. The panel 44 also constitutes a closure for the back of the camera when it is in use. The swing-back camera-box A is open at its bottom, with the exception of the cross-bar 32 at its rear, which constitutes a portion of the support for the back-frame A'.

When the camera is not in use, the front of the camera-box A is closed by the cover E, which has at its forward end a lip 15, (see Fig. 1,) adapted to engage a spring-catch 140 (see Fig. 3) on the camera-box. The spring-catch is depressed to release the cover E by means of a pin 16, whose manipulating-head is normally covered by the usual leather or other cover of the camera-box, which is not shown in the drawings, since it is too well known in the art to require illustration. When the catch 140 is depressed and disengaged from the lip 15, the cover E is automatically swung out some distance by means of springs 17, shown as carried by the cover and which engage the cross-bar 4 (or, more accurately, the portions of the metal secured to the cross-bar from which the supports D are turned up) when the cover is closed.

The camera-front C, connected to the swing-back by means of the collapsible bellows B, is adapted to slide along the cover E when said cover is opened for the purpose of securing the proper focus, said cover when constituting a portion of the camera-bed thus also constituting a focusing-board. The cover E is provided with a runway for the camera-front C, consisting of a ridge 6 and an overhanging metal plate 5, and the cross-bar 4 is provided also with a ridge 61 and an overhanging plate 51, constituting prolongations of the runway on the cover E. The camera-front has claws 7, which underlie the projecting guiding edges of the plates 5 and 51, so that the camera-front may slide freely back and forth, but is prevented from accidental detachment. The camera-front is clamped in position by means of a clamping-plate 8, carried thereby, which is forced down against the plates 5 and 51 by means of a clamping-screw 9, provided with a manipulating-handle 91. The camera-front is shown as provided with a vertically-adjustable lens-carrier H, which slides upon vertical rods 39, constituting part of the camera-front and which can be secured in any desired position of adjustment by means of the set-screw 40. The lens-carrier is shown as provided with usual devices, such as the handle 41 for shifting the usual diaphragm, which adjusts the size of the exposing-aperture, a milled head 42 for setting the exposing-shutter, and a handle 43 for tripping the shutter when a picture is to be taken.

The swing-back is pivotally connected to the supports D D, near the upper ends of said supports, and said supports terminate at about the middle of the swing-back, so that the axis on which the swing-back turns is approximately in line with the middle line of the sensitive surface, which is desirable, so as to secure the best results. The swinging of the back is, as usual, for the purpose of enabling a tall object being photographed to appear in the finished picture in proper perspective, and the best results are secured by causing the swing-back to turn on an axis approximately in line with the middle of the sensitive surface, and hence in line with the middle of the finished picture. For reasons also which will hereinafter be explained it is desirable that the swing-back when constituting also the camera box or casing, as is here the case, should have a bodily movement of translation—that is to say, an up-and-down movement. It is also important that the camera box or swing-back should be fastened in any position of inclination to which it may be adjusted. To enable these results to be accomplished, the swinging box is connected with the supports D, carried by the camera-bed, in the following manner: The sides of the swinging box are exterior to the supports D and to the cross-bar 4, so that they house and conceal them. The swinging box A is secured to the inside supports D in the position to which said box may be swung by a double-headed screw and nut fastener G G', which passes transversely through the wall of the box A and the corresponding inside support D and which is composed of the screw G, with an inside head 18, of any suitable form, and the nut G', with an outside thumb-head 19, exposed outside the camera-case and of a form to admit of ready manipulation, being provided, preferably, with wings 20, formed by a diametrical rib for manipulation by the photographer's fingers. There is a wear-plate 190 on the camera-box under the head 19, and the hub 21 of the nut G' passes through a round hole 22 (see Fig. 4) in the wall of box A, while the portion 23 of the shank of screw G is located in a slot 24 in the support D. In order to prevent the turning of the screw G when the fastener is closed or clamped, it is provided with the squared or angular portion 23, which fits in the slot 24, so that it cannot revolve therein. By unscrewing the nuts G' the fasteners are loosened, and the swinging box may then be turned to any desired position within its range of movement. By then again tightening up the nuts G' the supports D are securely clamped against the inner walls of the sides of the swinging box, thus holding the swinging box in position.

The camera as thus far described possesses no novelty, being substantially identical in construction, organization, and mode of operation with the camera illustrated in the above-mentioned joint application of myself and William F. Carlton, filed February 11, 1899, Serial No. 705,287, the parts thus far described herein being designated by reference letters and numerals corresponding to those employed in said application.

The present invention consists in the improved means for compelling the automatic rise and fall of the swinging box as it is tilted.

It will be noted that the cross-bar 4, constituting a portion of the camera-bed, also constitutes the bottom of the camera-box when it is closed. It is important when the camera is entirely closed that it should be wholly and completely closed, with no opportunity for access to its interior. Now it is evident that in case the swing-back is so constructed as to constitute also the camera box or casing and in case it should be hung upon a simple pivot it would be necessary to leave a gap at the bottom in order to permit the swing of the box. Therefore that there may be a complete closure it is necessary that there should be a vertical rise and fall of the swinging box as it swings. By thus providing a vertical rise and fall the cross-bar 4, constituting the bottom of the camera-box, may be provided, as shown, with a projecting lip or leaf 36, which extends immediately beneath the bottom of the cross-bar 32 at the lower end of the camera-box, which lip or leaf closes at all times the gap between said cross-bar 32 and the said cross-bar 4. In said prior application, Serial No. 705,287, such a lip or leaf is shown, together with means for automatically raising and lowering the camera-box as it swings; but the means therein shown for this purpose involve considerable friction and render it difficult to properly assemble the different parts of the camera.

In accordance with the present invention links I I are provided at opposite sides of the camera, each link being pivotally connected at its lower end to the camera-bed, being preferably pivoted directly to the inside of one of the supports D, near the lower end thereof, by the pivot-pin 45, and said link being also pivotally connected at its upper end by pivot-pin 46 to the inner wall of the side of the camera-box, being preferably pivoted to a metal plate 47, secured to the side of the camera.

As in the case of the camera set forth in said former application, Serial No. 705,287, the slots 24 in the supports D permit the vertical sliding movement of the pivotal fasteners G G', which are carried by the camera-box.

When the camera-box is tilted, the links I I compel it to automatically move bodily in a vertical direction, and by properly adjusting the pivotal points for the links there is always a close fit between the bottom cross-bar 32 of the camera-box and the lip or leaf 36, carried by the cross-bar 4. When the upper end of the camera-box is tilted forward, the upper ends of the links I are depressed, thus carrying the camera-box downwardly. When, however, the upper end of the camera-box is tilted back, the upper ends of said links swing forwardly, thus carrying the camera-box upwardly. The links, having simple pivots at their upper and lower ends, secure the mechanical advantage of enabling the box to swing easily and with little friction.

The cross-bar 4 is shown as provided with an interiorly-threaded socket 37 to enable it to be attached in the ordinary way to a tripod or other support.

I claim as my invention—

1. The combination of a camera-bed, a swing-back pivotally and slidingly connected therewith, and links pivotally connected at opposite ends to said camera-bed and swing-back respectively, whereby said swing-back moves vertically as it swings, substantially as set forth.

2. The combination of a camera-bed having vertically-extending supports, a swing-back pivotally and slidingly connected to said supports at approximately the middle line of said swing-back, and links pivoted at opposite ends to said camera-bed and to said swing-back, substantially as set forth.

3. The combination of a camera-bed which furnishes the bottom of the camera-casing, a swing-back constructed so as to form the sides and top of the camera box or casing thus constituting a swinging box, said swinging box being pivotally and slidingly connected with said camera-bed, and links pivotally connected at opposite ends to said bed and box respectively, substantially as set forth.

In witness whereof I have hereunto signed my name in the presence of two subscribing witnesses.

HARVEY W. LOCKE.

Witnesses:
GEO. J. MCLAUGHLIN,
J. M. WALMSLEY.